United States Patent Office 3,452,022
Patented June 24, 1969

3,452,022
QUININE POLYGALACTURONATE
Mortimer D. Sackler, New York, and Alfred Halpern, Great Neck, N.Y., assignors to Synergistics, Inc., Yonkers, N.Y., a corporation of New York
No Drawing. Filed Aug. 8, 1966, Ser. No. 570,698
Int. Cl. C07d 33/14, 43/24; A61k 27/00
U.S. Cl. 260—284                                    1 Claim

ABSTRACT OF THE DISCLOSURE

Quinine polygalacturonate and its method of preparation are described.

---

This invention relates to a new and novel salt of quinine, which exhibits unique physical and chemical properties as well as to result in a superior therapeutic effect. In particular it concerns quinine polygalacturonate, the method of its preparation and the method for achieving a therapeutic effect.

Quinine is an alkaloid obtained from the bark of the cinchona tree. The alkaloid is prepared by the process of extraction in the form of its salt and the free alkaloid is obtained by treatment with alkali. Quinine contains three molecules of water-of-crystallization and melts at about 57° C. When heated to temperatures of about 100° C., the water-of-crystallization is driven off and the anhydrous alkaloid melts at 177° C. Quinine has an extremely bitter nauseous taste and is alkaline in reaction, readily forming crystalline acid-salts.

Until recently quinine was the only drug available for the control of malaria and although synthetic antimalarial drugs have been utilized to control this disease, the therapeutic drug of choice remains quinine. Quinine readily controls the symptoms of malarial chill and severe paroxysms associated with the disease. As a suppressive agent, large doses of quinine are required; however, in the amounts employed for therapeutic purposes, quinine frequently produces unpleasant symptoms. The unpleasant symptoms associated with quinine administration are known collectively as cinchonism. The most common of these effects is a ringing in the ears, often accompanied by a sensation of fullness in the head, a dulling of the sense of hearing and an aberration of color vision. Symptoms of neurologic toxicity may also be present. Because of its irritant properties, quinine causes much gastric and intestinal irritation, which is marked by nausea, vomiting and diarrhea, accompanied by severe abdominal spasm.

The noxious side effects associated with quinine administration are due to both a systemic and local irritant effect. Systemically, the drug causes these untoward symptoms by a poisoning action on the nerve center as well as at the peripheral cellular site. Both the central nervous system and the end organ receptors are involved in the development of untoward symptoms. Locally the drug exerts a marked irritating action to the tissues, evoking a full cellular inflammatory response. The gastrointestinal symptoms arise both from local irritation and central systemic action.

While many efforts have been made to modify the irritating and noxious properties of quinine, these have met with little success. The preparation of soluble salts resulted in a more rapid absorption which caused a higher blood level but also resulted in a higher incidence of systemic toxic manifestations. When insoluble salts were prepared, the systemic toxicity was reduced but the therapeutic effect was also diminished. However, these insoluble salts had only little or no effect on the degree of gastrointestinal irritation.

It was found that when quinine was combined with polygalacturonic acid that a soluble salt of quinine was obtained. The pH of a 0.1 molar solution of the new salt, quinine polygalacturonate, is approximately neutral, that is, pH 6.85. The solution is stable and may be utilized for further pharmaceutical manufacture or may be used as a therapeutic agent. Because of the molecular size of the polygalacturonic acid, it is not absorbed and therefore acts as a demulcent to the gastrointestinal tract, which allays the irritational properties of the quinine molecule. Thus, through the administration of the solution of quinine polygalacturonate, the full therapeutic effects of quinine are observed, without the local gastrointestinal irritation, furthermore, because of its unique molecular size, the absorption of the quinine moiety is uniform but at a lower rate. This slower rate of absorption minimizes the occurrences of systemic toxicity through the avoidance of excessive blood levels.

Quinine polygalacturonate may be obtained in a solid form through the evaporation and crystallization of the solution of this compound. In this solid form, it has the appearance of a tan to white powder, without a definite melting point, although decomposition is observed to begin at about 180° C. The compound contains 58.9% of quinine (on an anhydrous basis) in chemical combination with polygalacturonic acid. There is virtually no free quinine alkaloid obtained by solvent extraction of quinine polygalacturonate. The compound evidences a unique infra-red spectrum which is characteristic for the molecule and establishes the presence of true salt formation by the shift in the identifying bonds. The ultra-violet spectrum is characteristic of the molecule and confirms the presence of quinine in the new compound.

The solid form of quinine polygalacturonate is particularly suitable for the preparation of pharmaceutically acceptable capsules, tablets, granules and powders, whereas the liquid form is preferred for the preparation of solutions, syrups, elixirs and parenteral pharmaceutical preparations. When either the solid dosage forms or the liquid dosage forms are administered to a human or an animal, the range in a daily dosage of active ingredient utilized to achieve the desired therapeutic effect is from 0.1 gm. to 2.0 gm. of quinine polygalacturonate.

In the preparation of tablets, capsules, granules and powders, the appropriate quantity of quinine polygalacturonate is mixed with a pharmaceutically accepted diluent, in a ratio of one part quinine polygalacturonate to from 1 to 10 parts of a pharmaceutically acceptable diluent, such as—starch, dextrose, sorbitol, mannitol, lactose and levulose. After intimately mixing the ingredients, the mixture is granulated with a pharmaceutically acceptable granulating agent, as for example, 1% gum acacia or, 1% gum tragacanth, or a 50% alcohol-water mixture, and the wetted material passed through a Fitzpatrick granulator. The particles are then dried and a tablet lubricant, such as magnesium stearate, is added and the whole compressed into tablets of suitable size and shape, so that each tablet contains from 100 mg. quinine polygalacturonate to 500 mg. of quinine polygalacturonate.

In the preparation of granules, the wetted mixture prepared as described above, is passed through a No. 8 standard mesh granulating screen and the particles air-dried. The unit dosage concentration of the granules is from 0.1 gm. to 1 gm. of quinine polygalacturonate per teaspoonful (5 gm.) of granule.

For the manufacture of powders, the appropriate quantity of quinine polygalacturonate is mixed with a suitable sweetened diluent, as for example, dextrose, sucrose or levulose. Artificial sweeteners and starches may also be utilized as a diluent. The ratio of active ingredient to diluent may be from 1 part active ingredient to 10 parts diluent. The mixture is intimately mixed and ground to a No. 60 particle size, or finer, and then subdivided into unit powder doses, so that each dose contains from 100 mg. to 1 gm. of quinine polygalacturonate.

In the preparation of capsules, the powder mixture described above may be utilized, and filled directly into capsules of suitable size and shape. The concentration of active ingredient for each capsule is from 0.1 gm. to 0.5 gm. of quinine polygalacturonate.

In the preparation of the liquid dosage form, either the solution of quinine polygalacturonate or the dispersed powder of quinine polygalacturonate may be used. Syrups are prepared by adding sufficient sugar to form a saturated solution whereas elixirs are prepared by the addition of sufficient alcohol and sugar, to meet the necessary pharmaceutical requirements for the concentration of these solvent ingredients of the class of pharmaceutical compounds known as elixirs. Irrespective of whether the liquid dosage form is a solution, syrup or an elixir, the unit dosage concentration of quinine polygalacturonate is from 0.1 gm. per teaspoonful (5 cc.).

In preparing a solution of quinine polygalacturonate for parenteral injection, a strict aseptic technique is employed. The concentration of quinine polygalacturonate is 360 mg. per 2 cc. of parenteral solution, although lesser or greater amounts may be preferred. The solvent employed is water-for-injection and the solution is sterilized by filtration through a bacterial filter prior to its packaging in pharmaceutically suitable sterile ampule vials. An amber ampule vial is preferred for quinine preparations.

Of particular importance in the preparation of pharmaceutical dosage forms is the unexpected advantage of the decrease in the bitter taste of quinine, by its combination with polygalacturonic acid. The new compound does not exhibit the nauseating, bitter taste so well known for quinine preparations and this reduction in bitterness results in a better patient acceptance of the medication. Furthermore, this reduced bitterness and more palatable taste is achieved without the use of special coatings, which not only increase the cost of the final preparation but interfere with the absorption of the compound. This advantage is of considerable therapeutic importance in the treatment of the malarial patient, who is required to take quinine, in relatively high dosage, over prolonged periods of time.

The following examples illustrate the scope of this invention.

EXAMPLE 1

A suspension of 20.85 gm. of polygalacturonic acid in 850 ml. of water, is placed in a 5 liter reaction vessel fitted with a stirrer, condenser and inlet tube. To this suspension is then added a solution of 32.4 gm. of quinine alkaloid dissolved in 850 cc. of ethanol. The mixture is stirred and warmed for one hour. At the end of this period the pH is between pH 6 and pH 7.5. One hundred mg. of quinine alkaloid are then added and the warming continued for an additional hour. The mixture is filtered and the clear filtrate treated with charcoal and filtered. The volume is adjusted to 1000 cc. with distilled water and the resultant solution has the following characteristics:

(a) Color: Clear colorless to yellow-amber, with a vivid fluorescence.
(b) Taste: Slight bitter taste.
(c) Optical rotation: Optically inactive.
(d) Ultraviolet spectrum:
Maxima.—237, 267 mu.
Minima.—226, 280, 329 mu.
(e) pH: pH 6.85 (not less than pH 6 and not more than pH 7.5).
(f) Chloroform extractive substances: Virtually no chloroform extractive material is obtained on the extraction with chloroform.

Upon acidification of the solution to a pH of below 2, with diluted sulfuric acid and then adding 1 to 2 drops of bromine test solution, followed by 1 ml. of ammonia test solution, an emerald green color due to the formation of thalleoquin, results. In carrying out this test it is preferable to dilute the test sample of the solution as prepared to one in a hundred, with water.

EXAMPLE 2

The solution obtained as a result of Example 1 above is concentrated under reduced pressure to ½ its volume. An equal volume of ethanol is then added and the mixture is then set aside to crystallize in an ice-chest. A gelatinous mass forms which changes into an amorphous powder on stirring. The solid material is filtered and dried. A second crop of solid material is obtained by repeating the precipitation process. The yield of solid material obtained in this way is approximately 85 percent. The solid material is quinine polygalacturonate and is an off-white to tan, granular powder, having two molecules of water-of-crystallization. Quinine polygalacturonate has no fixed melting point but begins decomposition at 180° C., which is complete at 182° C. The compound analyzes for 58.9 percent quinine and 41.1 percent polygalacturonic acid. On extraction of the dried powder with chloroform, virtually no free quinine is obtained. The compound is insoluble in ethanol, chloroform, benzene and most organic solvents.

EXAMPLE 3

Quinine polygalacturonate may be prepared by reacting an acid salt of quinine, such as quinine sulfate, quinine hydrochloride, quinine gluconate or quinine lactate, with an alkali metal salt of polygalacturonic acid such as the sodium, potassium, lithium, magnesium or calcium salt of polygalacturonic acid. In carrying out this reaction, the ratio of reactants should be at least equimolar, although it may be preferable to utilize a 0.1 molar excess of the quinine salt. The pH of the mixture is critical to the completeness of the reaction and when the pH has reached the range of between pH 6 and pH 7.5, the reaction is essentially complete. The solid quinine polygalacturonate is obtained by crystallization. Essentially this process is as follows: to 0.11 mol of quinine sulfate, dissolved in 1 liter of water, is added 0.1 mol of sodium polygalacturonate and the mixture stirred. When complete solution has been achieved, the mixture is filtered and the pH determined. The mixture is then set aside for a period of from 4 to 24 hours or it may be warmed for a period of 1 hour, after which time the water is evaporated under reduced pressure to about 1/10 its volume. Three parts ethanole are then added for each part of solution and the mixture filtered. The whole is then set aside to crystallize. The solid material compares in every way to that obtained in Example 2 above.

EXAMPLE 4

In place of the water used in Example 3 above, there may be substituted, wholly or in part, equivalent amounts of a liquid alkanol of from 1 through 3 carbon atoms in chain length. The remainder of the steps are the same.

EXAMPLE 5

Should it be desired to prepare a solid dosage form of quinine polygalacturonate for therapeutic use then the quinine polygalacturonate obtained as a result of Examples 2 and 3 above, may be utilized. In preparing tablets, capsules, granules and powders, a diluent is added, which is mixed with quinine polygalacturonate in a ratio of from 1 part quinine polygalacturonate to from 1 to 10 parts of a pharmaceutically acceptable diluent. Examples of diluents which may be found desirable are starch, dextose, sorbitol, mannitol, lactose and levulose. The exact ratios of active ingredient and diluent which will be utilized will depend upon the unit concentration of active ingredient in the particular dosage form selected. The range of concentration of active ingredient in the particular unit dosage form selected is from 0.1 gm. to 1 gm. of quinine polygalacturonate per unit dose.

To prepare tablets, the appropriate mixture of active ingredient and diluent is granulated with a 1 percent gum acacia solution or other pharmaceutically acceptable granulating agent, and the wetted material passed through a Fitzpatrick granulator. The particles are then dried and from 0.1 percent to ½ percent by weight of magnesium stearate is added, and the whole compressed into tablets of suitable size and shape, so that each tablet contains from 100 mg. to 500 mg. of quinine polygalacturonate.

To prepare granules, the appropriate mixture of quinine polygalacturonate prepared as described above, is moistened with a pharmaceutically acceptable granulating agent, such as 1 percent gum acacia or 1 percent gum tragacanth, and passed through a No. 8 standard mesh granulating screen. The particles are then air-dried. The unit dosage concentration of active ingredient in the granules is from 0.1 gm. to 1 gm. of quinine polygalacturonate per teaspoonful (5 gms.) of granules.

Capsules are prepared by directly filling either the active ingredient, quinine polygalacturonate or the mixture of quinine polygalacturonate and diluent, as described above, into gelatin capsules of suitable size and shape, so that each capsule contains from 0.1 gm. to 0.5 gm. of quinine polygalacturonate.

Powders are prepared by grinding the mixture of quinine polygalacturonate and diluent, as described above, to a particle size of a No. 60 powder, or finer, and then subdividing the mass into unit dosage form, so that each unit dose contains from 0.1 gm. to 1 gm. of quinine polygalacturonate. Regardless of the solid dosage form selected, the daily dosage of quinine polygalacturonate is from 0.1 gm. to 2 gm. per day, depending upon the patient's individual needs.

EXAMPLE 6

To prepare liquid pharmaceutical dosage forms, such as solutions, syrups and elixirs, the solution of quinine polygalacturonate, prepared according to Example 1, is utilized. To prepare a solution, the quinine polygalacturonate concentration of the product obtained as a result of Example 1 above, is determined by ultraviolet fluorometry and the volume of solvent adjusted to meet the specific dosage needs. Should it be desired to concentrate the solution, then this may be readily achieved by evaporation under reduced pressure, while the addition of water will serve to dilute the mixture to the proper volume. Suitable flavoring and coloring may be added, if desired, and the solution packaged in appropriate pharmaceutically acceptable containers so that each unit dose, one teaspoonful (5 cc.), contains from 0.1 gm. to 1 gm. of quinine polygalacturonate.

In the preparation of a syrup, the solution obtained as a result of Example 1 above, is assayed fluorometrically for its content of quinine polygalacturonate and then the calculated quantity of sugar is added. Sufficient sugar is added to make a pharmaceutical syrup, which contains about 85 percent by weight of sucrose. The final volume is adjusted with distilled water to the desired concentration. Suitable coloring and flavoring agents may be added, if necessary.

In the preparation of elixirs, the solution obtained as a result of Example 1 above, is utilized and sufficient sweetening agent is added therein. Ethanol is added up to a concentration of 20 percent and the final volume adjusted with distilled water. The range in dosage for the elixir is from 0.1 gm. to 1 gm. of quinine polygalacturonate per unit dose of 5 cc.

EXAMPLE 7

Should it be desired to prepare a sweetened solution of quinine polygalacturonate without the use of sugar for administration to those patients wherein sugar intake must be restricted, then the following method may be employed. The solution obtained as a result of Example 1 above is adjusted to the proper concentration by either evaporation or concentration of the solvent. A vegetable gum which is completely dispersible and miscible in the solvent is then added at a concentration of from 0.1 to ½ percent. Such gums as karaya, algin, guar and psyllium may be used. Sweetening agents such as calcium succaryl and saccharin are then added to the desired taste. A preferred ratio of these agents are ¼ of 1 percent of calcium cyclamate and ¹⁄₅₀ of 1 percent of saccharin per 100 cc. of solution. The product is then packaged for dispensing in the same manner as is the syrup in Example 6 above.

EXAMPLE 8

When it is desired to treat the patient with malaria, a daily dosage of from 0.1 gm. to 2 gm. of quinine polygalacturonate is administered. The exact dosage will depend upon the severity of infection, as well as the patient's physical status and age. The full spectrum of quinine activity will be observed after the administration of quinine polygalacturonate. Of particular significance will be the uniform absorption and the lack of gastrointestinal symptoms associated with quinine administration. Because of the unique properties of the new preparation, the noxious bitter taste is markedly reduced and good patient acceptability assured.

Should it be desired to utilize quinine polygalacturonate for the obliteration of varicose veins, then a solution prepared for injection is utilized and this is injected into the vein after first controlling the blood flow to the area by means of a tourniquet. A hyper-baric solution of quinine polygalacturonate is preferred for sclerosing therapy and this may be obtained through the addition of such substances as carboxymethylcellulose, if desired.

EXAMPLE 9

When it is desired to utilize quinine polygalacturonate in the therapy of a quinine-susceptible pathologic state such as is well known to clinicians then a daily dosage of 0.1 gm. to 2 gm. of quinine polygalacturonate is administered. The exact dosage will depend upon the therapeutic need of the patient as well as the patient's physical status and age. The full spectrum of quinine activity will be observed after the administration of quinine polygalacturonate. A notable difference between quinine polygalacturonate and the older quinine preparations is the absence of its bitter noxious taste, which often results in nausea and also the smooth absorption after either oral or rectal administration of quinine polygalacturonate. Because of the elimination of the noxious bitter taste, patient acceptance of the medication is greatly improved and a more consistent adherance to the prescribed therapeutic schedule of drug administration by the patient will result. In this way quinine polygalacturonate affords the clinician a more flexible method for the administration of quinine therapy.

What is claimed is:
1. Quinine polygalacturonate.

References Cited

UNITED STATES PATENTS

| | | | |
|---|---|---|---|
| 2,037,196 | 4/1936 | Greenbaum | 260—284 X |
| 2,049,442 | 8/1936 | Haegland | 260—284 |
| 2,111,227 | 3/1938 | Saltzberg | 260—284 |
| 2,230,631 | 2/1941 | Thomas | 260—284 |
| 2,878,252 | 3/1957 | Halpern | 260—284 |

OTHER REFERENCES

Hospital Formulary, Am. Soc. of Hosp. Pharmacists, Washington, 1968 edition, chapter 24:04 relied on.

ALEX MAZEL, *Primary Examiner.*

D. G. DAUS, *Assistant Examiner.*

U.S. Cl. X.R.

424—259